(12) United States Patent
Lee et al.

(10) Patent No.: US 9,619,096 B2
(45) Date of Patent: Apr. 11, 2017

(54) INPUT DEVICE HAVING MULTI-LEVEL DEVICE AND USER DEVICE INCLUDING THE SAME

(71) Applicant: Samsung Electronics Co., Ltd., Gyeonggi-do (KR)

(72) Inventors: Joo-Hoon Lee, Gyeonggi-do (KR); Ju-Hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 14/297,532

(22) Filed: Jun. 5, 2014

(65) Prior Publication Data

US 2014/0362012 A1 Dec. 11, 2014

(30) Foreign Application Priority Data

Jun. 5, 2013 (KR) ........................ 10-2013-0064993

(51) Int. Cl.
*G06F 3/041* (2006.01)
*G06F 3/046* (2006.01)

(52) U.S. Cl.
CPC ............ *G06F 3/046* (2013.01); *G06F 3/0416* (2013.01)

(58) Field of Classification Search
CPC .... G06F 3/046; G06F 3/0416; G06F 3/03545; G06F 2203/04106; G06F 3/047; G06F 1/3262; G06F 2203/0384; G06F 3/0418; H03F 3/211; H03F 1/0227; H03F 2200/387; H03F 2203/21106; H03F 2200/411; H03F 1/0277
See application file for complete search history.

(56) References Cited

U.S. PATENT DOCUMENTS

| | | | | |
|---|---|---|---|---|
| 5,506,375 A * | 4/1996 | Kikuchi | ................. | G06F 3/046 178/18.02 |
| 5,530,210 A * | 6/1996 | Fukuzaki | ................ | G06F 3/046 178/20.01 |
| 5,745,003 A * | 4/1998 | Wakimoto | ............. | H03K 17/76 327/109 |
| 5,898,136 A * | 4/1999 | Katsurahira | ............ | G06F 3/046 178/18.01 |
| 2007/0230633 A1 * | 10/2007 | Garg | ..................... | H04L 27/066 375/343 |
| 2010/0123741 A1 * | 5/2010 | Shin | ..................... | G09G 3/3426 345/690 |
| 2013/0038549 A1 * | 2/2013 | Kitada | .................. | G06F 3/0338 345/173 |
| 2013/0314370 A1 * | 11/2013 | Chang | ..................... | G06F 3/044 345/174 |

* cited by examiner

*Primary Examiner* — Towfiq Elahi

(57) ABSTRACT

One or more embodiments provide an input device including a multi-level driver and an operating method thereof. The input device includes a sensor board that includes at least one loop. The input device also includes at least one multi-level driver that includes a plurality of drivers, and is configured to output, to the at least one loop, a signal generated based on signals output from the plurality of drivers.

10 Claims, 11 Drawing Sheets

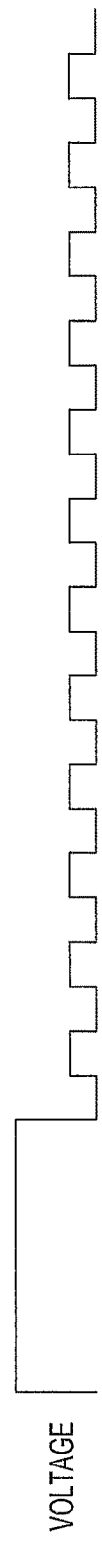

ative type touch screen that measures a change in capacitance generated by a touch is commonly used. The capacitive type touch screen has a drawback in that a user may always needs to touch a touch screen to provide a predetermined press or displacement, and a precise input using a pen is difficult.
INPUT DEVICE HAVING MULTI-LEVEL DEVICE AND USER DEVICE INCLUDING THE SAME

CROSS-REFERENCE TO RELATED APPLICATION(S) AND CLAIM OF PRIORITY

The present application is related to and claims the priority under 35 U.S.C. §119(a) to Korean Application Serial No. 10-2013-0064993, which was filed in the Korean Intellectual Property Office on Jun. 5, 2013, the entire content of which is hereby incorporated by reference.

TECHNICAL FIELD

Various embodiments of the present disclosure relate to an input device, for example, an electromagnetic type digitizer and a driving method thereof.

BACKGROUND

Recently, the market associated with user devices, such as a smart phone or a tablet computer and the like, has rapidly grown, and a touch screen has been widely utilized as an input device of a user device. The touch screen is generally formed of transparent electrodes, and a capacitive type touch screen that measures a change in capacitance generated by a touch is commonly used. The capacitive type touch screen has a drawback in that a user may always needs to touch a touch screen to provide a predetermined press or displacement, and a precise input using a pen is difficult.

To readily provide an input using a pen, recently, technologies associated with an input device using an electromagnetic wave have been mostly used.

SUMMARY

A conventional technology uses a single driver corresponding to a single sensor loop or a limited number of drivers and thus, a signal level that may be input to sensor loops may be limited. For example, due to a limit on a driving capability of a driver, a signal level greater than or equal to the limit may not be input to a sensor loop. When a signal level greater than or equal to the limit is input, wrong information data, such as misidentification of coordinates/press and/or the like, may be output due to distortion of a signal. For example, a signal level of a sensor loop adjacent to a metal may be more reduced than usual. However, a user device has a limit in increasing a capacity of a driver due to a limited amount of power being supplied.

For example, a metallic bracket may be disposed, for rigidity of a portable user device or a tablet, under a digitizer contained in an electronic device such as a portable user device or a tablet. In the dispositional structure, due to a bracket adjacent to an edge area of the digitizer, a signal reduction occurs. Accordingly, there is a drawback in that precise writing is difficult since performance of the edge area is poor, and a possible hovering height of the edge area is lowered due to the signal reduction.

To address the above-discussed deficiencies, it is a primary aspect of the present disclosure is to transmit signals of various levels for each sensor loop by enabling each sensor loop to have various signal outputs using a multi-level driver.

Another aspect of the present disclosure is to increase a signal level that may drive a sensor loop so as to improve misidentification by noise and distortion when a signal detected by the sensor loop is analyzed.

Another aspect of the present disclosure is to adjust a possible hovering height that is lowered due to signal reduction, and to enable a precise writing in an edge area.

Another aspect of the present disclosure is to selectively drive a high-capacity driver based on a hovering state of an input unit or a contact or proximity state of the input unit, so as to improve a hovering performance and to minimize power consumption.

Another aspect of the present disclosure is to use different signal intensities for an activation signal and a signal for detecting a user input so as to promptly drive an input unit and to minimize power consumption.

In accordance with another aspect of the present disclosure, there is provided an input device, the input device including: a sensor board that includes at least one loop; and at least one multi-level driver that includes a plurality of drivers, and is set to output, to the at least one loop, a signal generated based on at least one signal output from the plurality of drivers.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, and/or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 12A, 12B, 12C and 12D illustrate an example of applying a digitizer according to various embodiments of the present disclosure.

DETAILED DESCRIPTION

Figure 1:
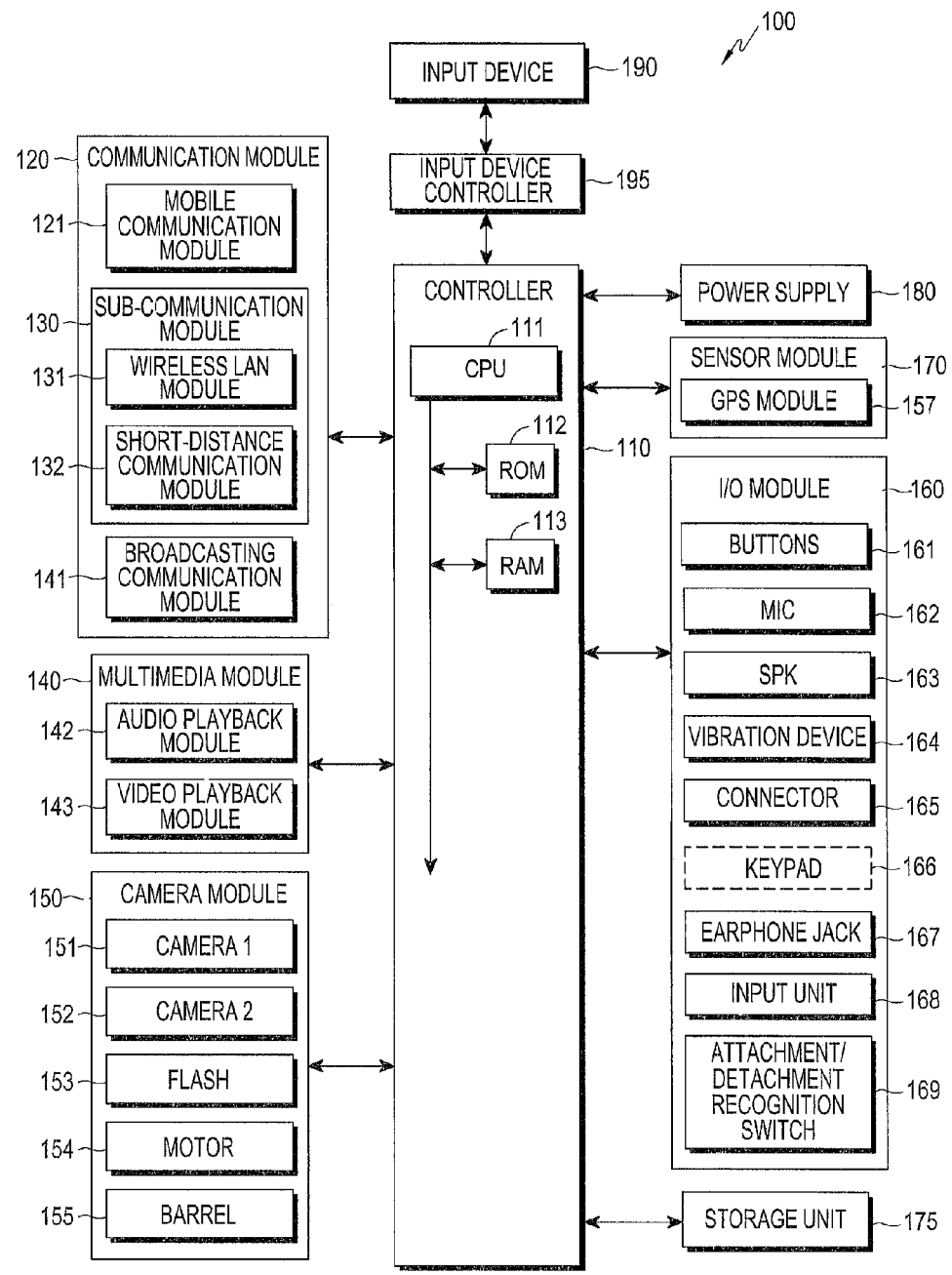
FIG. 1 illustrates a block diagram showing a user device according to various embodiments of the present disclosure.

FIGS. 1 through 12D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The present disclosure may be variously changed and may have various embodiments, among which specific embodiments will be exemplified in the accompanying drawings and described below in detail. Therefore, it should be understood that there is no intent to limit example embodiments to the particular forms disclosed, but alternatively, example embodiments are to cover all modifications, equivalents, and alternatives falling within the scope of the disclosure.

While terms including ordinal numbers, such as "first" and "second," and/or the like, may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

As used herein, terms are used merely for describing specific embodiments and are not intended to limit the present disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. Such terms as those defined in a generally used dictionary are to be interpreted to have the meanings equal to the contextual meanings in the relevant field of art, and are not to be interpreted to have ideal or excessively formal meanings unless clearly defined in the present specification.

The term 'layering' used in various embodiments of the present disclosure may be replaced with the term 'disposition'.

A user device used in various embodiments of the present disclosure may be an electronic device that is functionally connected with an input device. For example, the user device may be referred to as a portable device, a mobile terminal, a communication terminal, and/or the like.

For example, the user device may be a smart phone, a portable phone, a game console, a Television (TV), a display device, a head unit for a vehicle, a notebook computer, a laptop computer, a Tablet computer, a Personal Media Player (PMP) or Personal Digital Assistants (PDA), and/or the like. The user device may be embodied as a pocket-sized portable communication user device having a wireless communication function. Also, the user device may be a flexible device or a flexible display device. A few component elements of the user device may be omitted or changed, as needed.

FIG. 1 illustrates a block diagram showing a user device 100 according to various embodiments of the present disclosure. Referring to FIG. 1, for example, the user device 100 may include a controller 110, a communication module 120, a multimedia module 140, a camera module 150, an input/output module 160, a sensor module 170, a storage unit 175, a power supplier 180, an input device 190 (for example, a touch screen), and an input device controller 195.

Referring to FIG. 1, the user device 100 may be connected with an external electronic device (not illustrated) using at least one of a communication module 120, a connector 165, and an earphone connecting jack 167. The electronic device includes one of various devices such as an earphone, an external speaker, a Universal Serial Bus (USB) memory, a charger, a cradle/dock, a DMB antenna, a mobile payment related device, a health management device (blood sugar tester and/or the like), a game machine, a car navigation device and/or the like which may be attached to the user device 100 through a wire and removable from the user device. Further, the electronic device includes a Bluetooth communication device, a Near Field Communication (NFC) device, a WiFi Direct communication device, and a wireless Access Point (AC) which may be wirelessly connected. According to an embodiment, the user device 100 may be wired or wirelessly connected with another portable user device or an electronic device, for example, a portable phone, a smart phone, a tablet Personal Computer (PC), a desktop PC, or a server.

The controller 110 may include, for example, a Central Processing Unit (CPU) 111, a Read-Only Memory (ROM) 112, and a Random-Access Memory (RAM) 113. The ROM 112 may store a control program for controlling the user device 100. The RAM 113 may be used as a memory space for storing a signal or data input from the outside of the user device 100 or for a work performed in the user device 100. The CPU 111 includes a single core, a dual core, a triple core, or a quadruple core. The CPU 111, the ROM 112, and the RAM 113 may be mutually connected to each other through an internal bus.

The controller 110 can control the communication module 120, the multimedia module 140, the camera module 150, the input/output module 160, the sensor module 170, the storage unit 175, the power supplier 180, the input device 190, and the input device controller 195.

The controller 110 detects a user input as an input unit 168 or a touchable user input means such as a user's finger and/or the like touches or approaches one object or is located close to the object in a state where a plurality of objects or items are displayed on the input device 190, and identifies an object corresponding to a position of the input device 190 where the user input is generated. A user input through the input device 190 may include one of a direct touch input that directly touches an object, and a hovering input corresponding to an indirect touch input that approaches an object within a predetermined recognition distance but does not directly touch the object. For example, when the input unit 168 is located close to the input device 190, an object located directly below the input unit 168 may be selected. In various embodiment of the present disclosure, a user input may include a gesture input through the camera module 150, a switch/button input through the button 161 or the keypad 166, a voice input through the microphone 162, and/or the like, in addition to the user input through the input device 190.

The object or item (or function item) is displayed or may be displayed on the input device 190 of the user device 100. For example, the object or item indicates at least one of an application, a menu, a document, a widget, a picture, a video, an e-mail, a Short Messaging Service (SMS) message, and a Multimedia Messaging Service (MMS) message, and may be selected, executed, deleted, canceled, stored, and changed by a user input means. The item may be used as a meaning including a button, an icon (or short-cut icon), a thumbnail image, and a folder storing at least one object in the user device. Also, the item may be displayed in a form of an image, a text, and/or the like.

A shortcut icon is an image that is displayed on the input device 190 of the user device 100 for quick execution of each application or a call, a phone book, a menu, and/or the like basically provided in the user device 100. When a command or a selection is input to execute the shortcut icon, a corresponding application may be executed.

Further, the controller 110 may detect a user input event such as a hovering event as the input unit 168 approaches the input device 190 or is located close to the input device 190.

When a user input event is generated according to a preset item or in a preset manner, the controller 110 may perform a preset program action corresponding to the user input event.

The controller 110 may output a control signal to the input unit 168 or the vibration device 164. The control signal includes information on a vibration pattern and the input unit 168 or the vibration device 164 generates a vibration according to the vibration pattern. The information on the vibration pattern may indicate the vibration pattern itself or an identifier of the vibration pattern. Alternatively, the control signal may include only a request for generating the vibration.

The communication module 120 may include a mobile communication module 121, a sub communication module 130, and a broadcasting communication module 141.

The mobile communication module 121 enables the user device 100 to be connected with the external electronic device through mobile communication by using at least one antenna or a plurality of antennas (not illustrated) according to a control of the controller 110. The mobile communication module 121 may transmit/receive a wireless signal for a voice call, a video call, an SMS, or an MMS to/from a portable phone (not illustrated), a smart phone (not illustrated), a tablet PC, or another electronic device (not illustrated) having a phone number input into the user device 100.

The sub communication module 130 includes at least one of the wireless LAN module 131 and the short distance communication module 132. For example, the sub communication module 130 includes only the wireless LAN module 131, only the short distance communication module 132, or both the wireless LAN module 131 and the short distance communication module 132.

The wireless LAN module 131 may be Internet-connected in a place where a wireless Access Point (AP) (not illustrated) is installed according to a control of the controller 110. The wireless LAN module 131 supports a wireless LAN standard (IEEE802.11x) of the Institute of Electrical and Electronics Engineers (IEEE). The short distance communication module 132 may wirelessly perform short distance communication between the user device 100 and an external electronic device according to a control of the controller 110. A short distance communication scheme may include Bluetooth, Infrared Data Association (IrDA) communication, WiFi-Direct communication, Near Field Communication (NFC) and/or the like.

The controller 110 may transmit a control signal according to a vibration pattern to the input unit 168 through the sub communication module 130.

The broadcasting communication module 141 may receive a broadcasting signal (for example, a TV broadcasting signal, a radio broadcasting signal, or a data broadcasting signal) and broadcasting supplement information (for example, Electronic Program Guide (EPG) or Electronic Service Guide (ESG)) output from a broadcasting station through a broadcasting communication antenna (not illustrated) according to a control of the controller 110.

The multimedia module 140 includes an audio playback module 142 or the video playback module 143. The audio playback module 142 may play back a digital audio file (for example, a file having a file extension of mp3, wma, ogg, or way) stored in the storage unit 175 or received according to a control of the controller 110. The video playback module 143 may play back a digital video file (for example, a file having a file extension of mpeg, mpg, mp4, avi, mov, or mkv) stored or received according to a control of the controller 110.

The multimedia module 140 may be integrated in the controller 110.

The camera module 150 includes at least one of the first camera 151 and the second camera 152 for photographing a still image or a video according to a control of the controller 110. Further, the camera module 150 may include at least one of a barrel 155 performing a zoom-in/out for photographing a subject, a motor 154 controlling a motion of the barrel 155, and a flash 153 providing an auxiliary light source required for photographing a subject. The first camera 151 may be disposed on the front surface of the user device 100 and the second camera 152 may be disposed on the rear surface of the user device 100.

Each of the first and second cameras 151 and 152 may include a lens system, an image sensor, and/or the like. The cameras 151 and 152 convert an optical signal input (or photographed) through the lens system to an image signal and output the image signal to the controller 110. Then, the user may photograph a video or a still image through the cameras 151 and 152.

The input/output module 160 may include at least one button 161, at least one microphone 162, at least one speaker 163, at least one vibration device 164, the connector 165, the keypad 166, the earphone connecting jack 167, and the input unit 168. The input/output module 160 is not limited thereto, and a mouse, a trackball, a joystick, or a cursor control such as cursor direction keys may be provided for controlling a motion of a cursor on the input device 190.

The button 161 may be formed on a front surface, a side surface, or a back surface of a housing (or of a case) of the user device 100, and may include at least one of a power/lock button, a volume button, a menu button, a home button, a back button, and a search button.

The microphone 162 receives a voice or a sound to generate an electrical signal according to a control of the controller 110.

The speaker 163 may output sounds corresponding to various signals or data (for example, wireless data, broadcasting data, digital audio data, digital video data, and/or the like) to the outside of the user device 100 according to a control of the controller 110. The speaker 163 may output a sound (for example, button tone corresponding to phone communication, a ring back tone, and a voice of a partner) corresponding to a function performed by the user device 100. One or more speakers 163 may be formed at a proper position or positions of the housing of the user terminal 100.

The vibration device 164 may convert an electrical signal to a mechanical vibration according to a control of the controller 110. For example, when the user device 100 in a vibration mode receives a voice or video call from another device (not illustrated), the vibration device 164 operates. One or more vibration devices 164 may be formed within the housing of the user device 100. The vibration device 164 may operate in response to a user input through the input device 190.

The connector 165 may be used as an interface for connecting the user device 100 with an external electronic device or a power source (not illustrated). The controller 110 may transmit or receive data stored in the storage unit 175 of the user device 100 to or from an external electronic device through a wired cable connected to the connector 165. The user device 100 may receive power from the power source through the wired cable connected to the connector 165 or charge a battery (not illustrated) using the power source.

The keypad 166 may receive a key input from a user so as to control the user terminal 100. The keypad 166 may include a physical keypad (not illustrated) formed in the user device 100 or a virtual keypad (not illustrated) displayed on the input device 190. The physical keypad formed in the user device 100 may be omitted according to a capability or a structure of the user device 100.

An earphone (not illustrated) may be inserted into the earphone connecting jack 167 to be connected with the user device 100.

The input unit 168 may be inserted into the user device 100 for storage. When it is used, it may be taken out from or detached from the user device 100. An attachment/detachment recognition switch 169 that operates in accordance with an installation and attachment/detachment of the input unit 168 is included in one area within the user device 100 into which the input unit 168 is inserted, and the attachment/detachment recognition switch 169 may output signals corresponding to the installation and separation of the input unit 168 to the controller 110. The attachment/detachment recognition switch 169 may be configured to be in direct/indirect contact with the input unit 168 when the input unit 168 is mounted. Accordingly, the attachment/detachment recognition switch 169 may generate a signal corresponding to the installation or the separation of the input unit 168 (that is, signal informing of the installation or the separation of the input unit 168) based on whether the attachment/detachment recognition switch 169 is in contact with the input unit 168, and may output the generated signal to the controller 110.

The sensor module 170 may include at least one sensor that detects the state of the user device 100. For example, the sensor module 170 includes at least one of a proximity sensor for detecting whether a user approaches the user device 100, an illumination sensor (not illustrated) for detecting an amount of ambient light of the user device 100, a motion sensor (not illustrated) for detecting a motion (for example, rotation, acceleration, or vibration of the user device 100) of the user device 100, a geo-magnetic sensor for detecting a point of the compass of the user device 100 using the Earth's magnetic field, a gravity sensor for detecting a gravity action direction, an altimeter for measuring an atmospheric pressure to detect an altitude, a GPS module 157, and/or the like.

The GPS module 157 may receive radio waves from a plurality of GPS satellites (not illustrated) in Earth's orbit and may calculate a position of the user device 100 using Time of Arrival from the GPS satellites to the user device 100.

The storage unit 175 may store a signal or data input/output according to an operation of the communication module 120, the multimedia module 140, the camera module 150, the input/output module 160, the sensor module 170, or the input device 190, according to a control of the controller 110. The storage unit 175 may store a control program and an application for controlling the user device 100 or the controller 110 and applications.

Also, the storage unit 175 may store various applications such as a navigation, video calls, games, time-based alarm applications, and/or the like; images to provide a Graphical User Interface (GUI) related to the applications; databases or data related to user information, documents and methods for processing a touch-input; background images (e.g., a menu screen, an idle screen, and/or the like) or operating programs for operating the user device 100; and images captured by the camera module 150.

The storage unit 175 is a machine (for example, computer)-readable medium, and the term of the machine-readable medium may be defined as a medium for providing data to the machine to perform a specific function. The storage unit 175 may include a non-volatile medium and a volatile medium. All of these media could be a type that allows the instructions transferred by the media to be detected by a physical instrument through which the machine reads the instructions.

The computer readable medium may include, but is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash-EPROM.

The power supplier 180 may supply power to one battery or a plurality of batteries arranged at the housing of the user device 100 according to a control of the controller 110. One or a plurality of batteries may supply power to the user device 100. Further, the power supplier 180 may supply power input from an external power source through a wired cable connected to the connector 165 to the user device 100. In addition, the power supplier 180 may supply power wirelessly input from the external power source through a wireless charging technology to the user device 100.

The user device 100 may include at least one input device 190 that provides a user with user graphic interfaces corresponding to various services (for example, calling, data transmission, broadcasting, and image capturing).

The input device 190 may output, to the input device controller 195, a signal corresponding to at least one user input that is input to the user graphic interface.

The input device 190 may receive at least one user input through a body part of a user (for example, a finger including a thumb) or the input unit 168 (for example, a capacitive type or EM type stylus pen and a capacitive type or EM type electronic pen).

The input device 190 may receive successive motions of a single touch (for example, an input of dragging). The input device 190 may output, to the input device controller 195, a signal corresponding to the successive motions of the input touch.

In various embodiments of the present disclosure, the touch may not be limited to a contact between the input device 190 and a finger or the input unit 168, and may include a non-contact (for example, an embodiment in which a user input means is placed within a recognition distance (for example, 1 cm) in which the user input means may be detected without being in contact with the input device 190).

The input device 190 may be embodied based on varied types, for example, a resistive type, a capacitive type, an infrared type, an acoustic wave type, an EM type, or a combination thereof.

Also, the input device 190 may include at least two digitizers 210 and 230 that respectively sense a finger input and a pen input so as to distinctively detect an input (for example, a finger input) by a first user input means (a body part such as a finger and/or the like) and an input (for example, a pen input) by a second user input means such as the input unit 168). The at least two digitizers 210 and 230 may provide different output values to the input device controller 195. The input device controller 195 may recognize the values input by the at least two digitizers 210 and 230 as different values. Accordingly, whether an input from the input device 190 corresponds to an input by a finger or corresponds to an input by the input unit 168 may be distinguished. For example, the input device 190 may have a structure of a combination of the capacitive type digitizer 210 and the EM type digitizer 230. Also, as described above, the input device 190 may be configured to include touch keys such as a menu button 161b, a back button 161c, and/or the like. Accordingly, a finger input or a finger input on the input device 190 in various embodiments of the present disclosure may include a touch input on those touch keys.

The input device controller 195 may convert a signal input from the input device 190 into a digital signal and transmits the digital signal to the controller 110. The controller 110 may control the input device 190 using the digital signal received from the input device controller 195. For example, the controller 110 may allow a short-cut icon (not illustrated) or an object displayed on the input device 190 to be selected or executed in response to a direct touch event or a hovering event. Also, the input device controller 195 may be integrated into the controller 110.

The input device controller 195 may identify a hovering interval or distance as well as a position of a user input by detecting a value (for example, a current value and/or the like) output through the input device 190, may convert the identified distance value to a digital signal (for example, a Z coordinate), and then may provide the digital signal to the controller 110. Also, the input device controller 195 may detect a value (for example, a current value and/or the like) output through the input device 190 so as to detect a pressure at which a user input means presses the input device 190, and may convert the determined pressure value into a digital signal so as to provide the digital signal to the controller 110.

Figure 2:
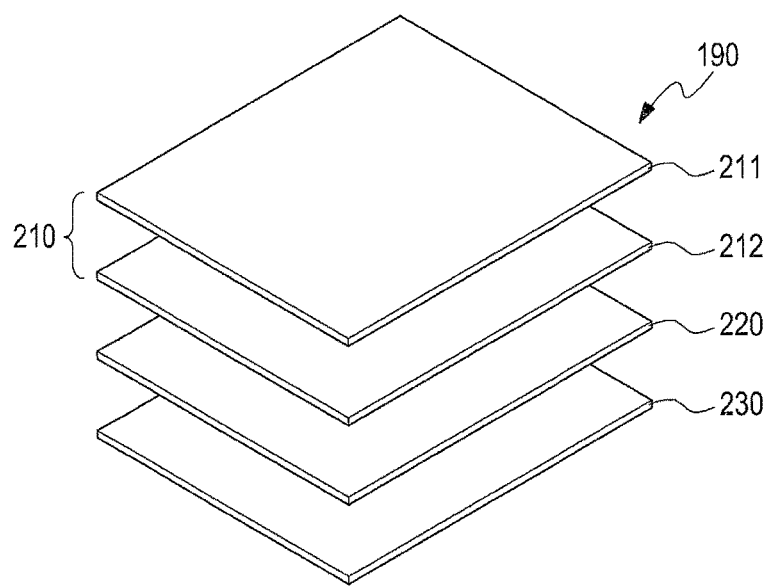
FIG. 2 illustrates a perspective view of a part of a configuration of an input device according to various embodiments of the present disclosure.

FIG. 2 illustrates a perspective view of a part of a configuration of an input device according to various embodiments of the present disclosure. As illustrated in FIG. 2, an input device 190 has a configuration in which a touch panel 210 for sensing a finger input, a display unit 220 for displaying a screen, and a digitizer 230 for sensing a pen input are sequentially disposed from top to bottom to be closely contacted with or partially spaced apart from one another. The touch panel 210 and the digitizer 230 may be referred to as a first digitizer and a second digitizer, respectively.

The display unit 220 may include a plurality of pixels, and may display an image through the pixels.

As the display unit 220, a Liquid Crystal Display (LCD), an Organic Light Emitting Diode (OLED), a Light Emitting Diode (LED), and/or the like may be used.

The touch panel 210 may include a window 211 displayed on a front side of the user device 100 and a sensor layer 212 for recognizing information (a position, an intensity, and/or the like) of a finger input. The first touch panel 210 may be configured to provide the touch keys, such as the menu button 161b, the back button 161c, and/or the like disposed under the screen exposed to the user.

A top surface of the window 211 may form at least a portion of the front side of the input device 190 that is exposed to the outside. The window 211 may be formed of an insulation material that is transparent with respect to visible light. The insulation material may include, for example, a synthetic resin or a plastic, such as polyimide, polyethylene, terephthalate, and/or the like.

On the top surface of the window 211, a hard coating layer with high hardness for preventing scratches may be layered. The hard coating layer may have an anti-glare function together with a hardness improvement function. For example, the hard coating layer may be formed of a material that is formed by adding a light-scattering agent to a conventional hard coating agent.

The sensor layer 212 forms a sensor for recognizing a position of the first user input means when the first user input means is in contact with the surface of the window 211. For this, the sensor layer 212 may have predetermined patterns. The sensor layer 212 may have various patterns such as a linear grid pattern, a diamond pattern and/or the like, and the linear grid pattern is described as an example in the present embodiment. The sensor layer 212 may be layered on a lower surface of the window 211 or a bottom (or a lower surface) may be attached to a top (or a top surface) of the display unit 220.

To perform a sensing function, a sensing signal of which a waveform is modified due to a capacitance between the sensor layer 212 and the first user input means may be generated in the sensor layer 212 when a scan signal having a predetermined waveform is provided and the first user input means is in contact with the surface of the window 211. The controller 110 may analyze the sensing signal so as to recognize whether the first user input means is in contact and a position of the contact. The controller 110 detects generation of a finger touch event based on a sensing signal having a peak value greater than or equal to a threshold (or a minimum value less than or equal to the threshold) and also detects a finger input position. The threshold is a value by which a noise and a normal signal may be distinguished. The threshold is experimentally set, and may be set to have, for example, a voltage greater than or equal to 0 V or a capacitance value greater than or equal to 0 pf. Depending on the situation, a finger is merely an example of the first user input means, and any means that is capable of providing a capacitance between the sensor layer 212 and the first user input means may be used as the first user input means.

Figure 3:
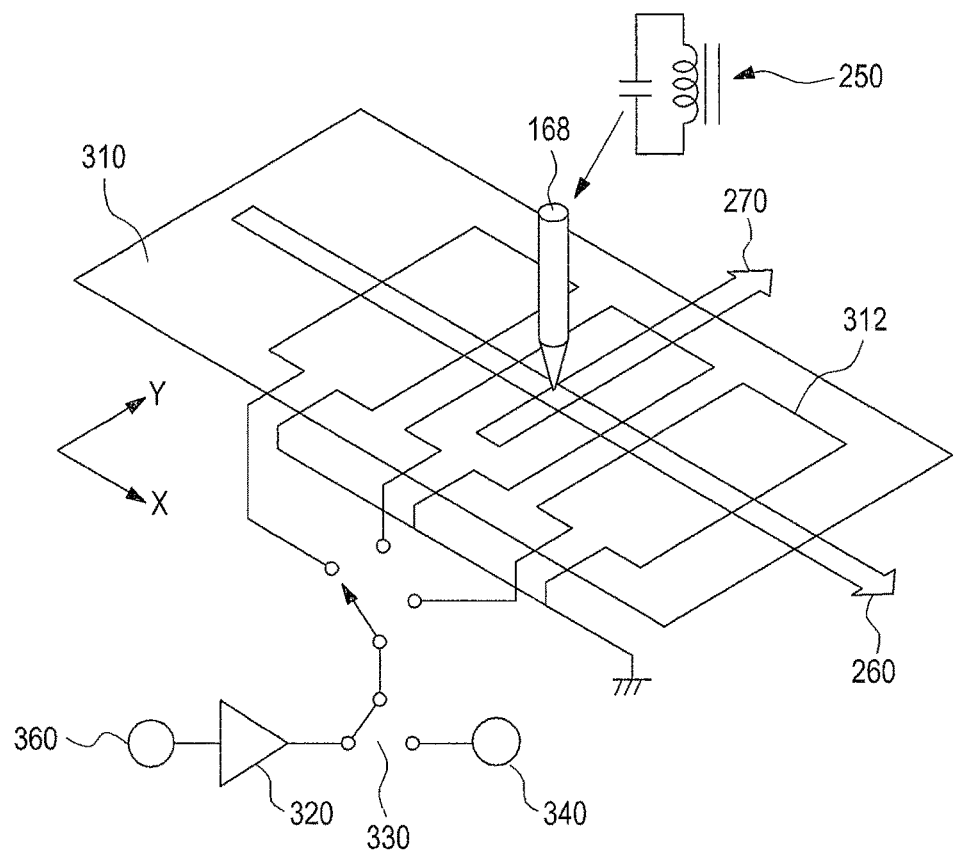
FIG. 3 illustrates a digitizer according to various embodiments of the present disclosure.

FIG. 3 illustrates a digitizer according to various embodiments of the present disclosure.

The digitizer, corresponding to an EM type digitizer, may include a sensor board 310, a transmission circuit 360, a multi-level driver 320, a switch 330, and a reception circuit 340. Hereinafter, the level refers to a voltage level, a current level, or a power level.

The transmission circuit 360 may output a signal based on a digital control signal of the controller 110 or the input device controller 195.

The multi-level driver 320 may amplify a signal input from the transmission circuit 360 and may output the amplified signal to the switch 330.

The switch 330 may connect the multi-level driver 320 with a corresponding loop of the sensor board 310, and may provide a signal input from the multi-level driver 320 to the corresponding loop, when the digitizer performs transmission.

The sensor board 310 includes a plurality of loops 312, may operate based on a signal input from the multi-level driver 320 through the switch 330, and may output a received signal to the switch 330. The plurality of loops 312 include loops aligned along an X axis 260 and loops aligned along a Y axis 270, and FIG. 3 illustrates only the loops aligned along the X axis 260. A loop may be referred to as an antenna loop, a sensor coil, a sensor loop, or an antenna channel.

An electromagnetic signal output from the input unit 168 may be detected by the loop 312, and a position where the input unit 168 adjacent to the digitizer exists may be determined.

Each loop 312 may convert an input signal from the multi-level driver 410 through the switch 330 into an electromagnetic signal, and may output the electromagnetic signal. A resonance circuit 250 of the input unit 168 may absorb the electromagnetic signal. The resonance circuit 250 may include a variable coil that is capable of changing a frequency, and a capacitor. The input unit 168 may output again the electromagnetic signal that the input unit 168 absorbed, using the resonance circuit, and the loop 312 absorbs the electromagnetic signal output by the input unit 168 and outputs the electromagnetic signal as a signal. The input unit 168 is merely an example, and any means that is capable of outputting an electromagnetic signal may be used.

The switch 330 may connect the reception circuit 340 with a corresponding loop 312 of the sensor board 310, and may output a signal input from the corresponding loop 312 to the reception circuit 340 when the digitizer performs reception.

The reception circuit 340 may convert a signal input from the switch 330 into a digital signal and may output the digital signal to the controller 110 or the input device controller 195.

The controller 110 or the input device controller 195 may obtain X axis and Y axis coordinates of a position of a pen input from a digital signal having a peak value greater than or equal to a threshold value from among digital signals input from the reception circuit 340.

For example, when the digitizer transmits a signal, the switch 330 may connect the multi-level driver 320 with a corresponding loop of the multi-level driver 320. Conversely, when the loop absorbs a signal that the input unit 168 has absorbed and output, the switch 330 may connect the loop and the reception circuit 340.

Figure 4:
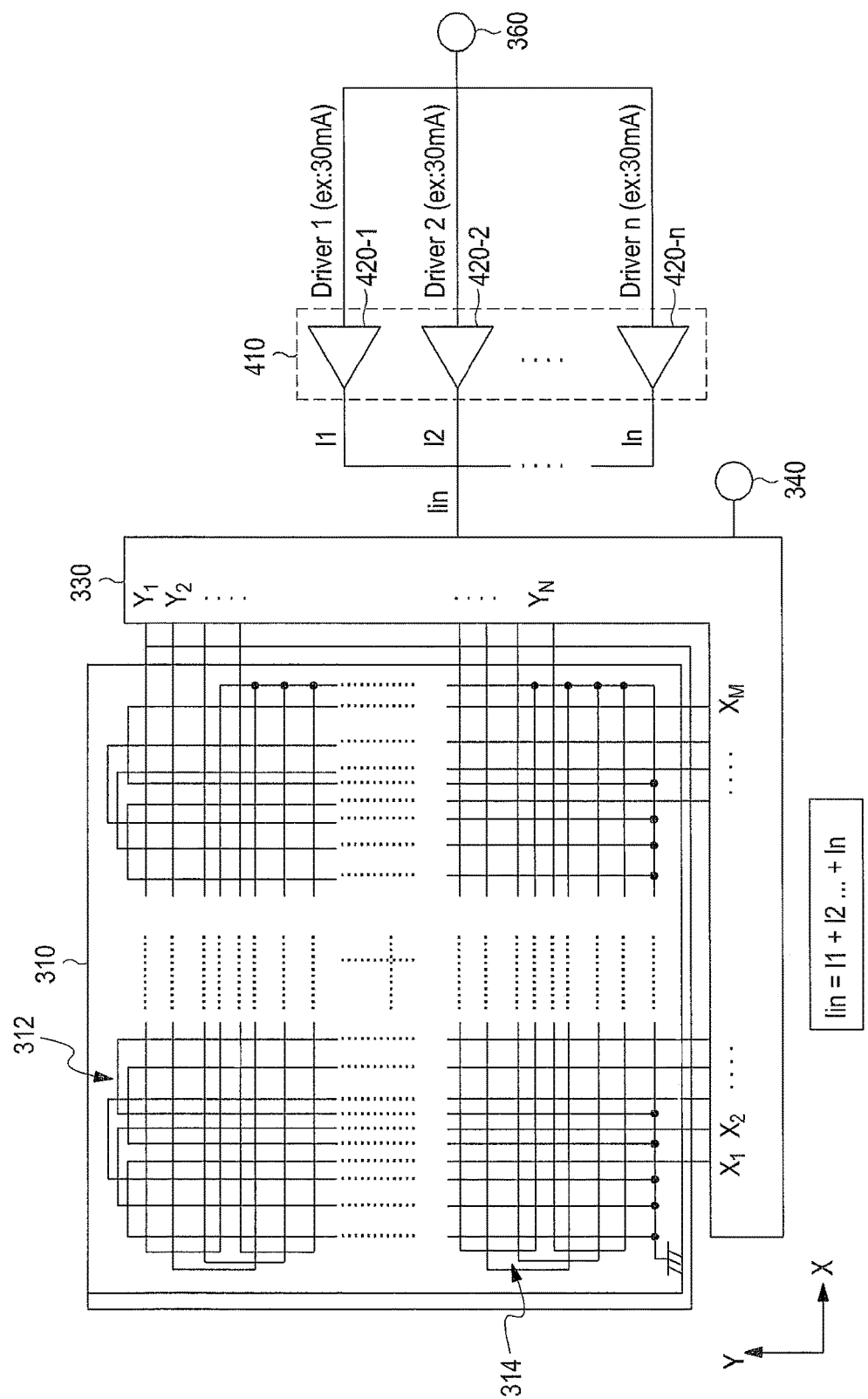
FIG. 4 illustrates a block diagram showing a configuration of a digitizer according to various embodiments of the present disclosure.

FIG. 4 illustrates a block diagram showing a configuration of a digitizer according to various embodiments of the present disclosure.

The digitizer, corresponding to an EM type digitizer, may include the sensor board 310, the transmission circuit 360, a multi-level driver 410, the switch 330, and the reception circuit 340.

The transmission circuit 360 may output a signal based on a digital control signal of the controller 110 or the input device controller 195.

The multi-level driver 410 may include a plurality of unit drivers 420-1 through 420-n having an identical capacity, and each driver 420-1 through 420-n may amplify (or damp) a signal input from the transmission circuit 360 and may output the amplified (damped) signal. At least a few of the outputs "I1" through "In" of the plurality of unit drivers 420-1~420-n may be added up according to a control of the controller 110 or the input device controller 195, and may be output to the switch 330. In various embodiments of the present disclosure, a unit driver may be also referred to as a uni-level driver.

The switch 330 may connect the multi-level driver 410 to a corresponding loop of the sensor board 310, and may provide a signal (Iin) input from the multi-level driver 410 to the corresponding loop, when the digitizer performs transmission. The X axis loops 312 and the Y axis loops 314 of the sensor board 310 may be disposed to be orthogonal. The X axis loops 312, for example, may be extended to be relatively longer in a direction of the Y axis than a direction of the X axis, and may be used for detecting an X axis coordinate of a position of a pen input. For example, the sensor board 310 may include 40 (M=40) X axis loops 312 and 30 (N=30) Y axis loops 314.

The Y axis loops 314, for example, may be extended to be relatively longer in a direction of the X axis than a direction of the Y axis, and may be used for detecting a Y axis coordinate of a position of a pen input.

The Y axis loops 314 may convert an input signal from the multi-level driver 410 through the switch 330 into a first electromagnetic signal, and may output the first electromagnetic signal to the outside. The input unit 168 may receive the first electromagnetic signal, may generate a second electromagnetic signal according to an operation of the resonance circuit 250, and may output the second electromagnetic signal to the outside. The X axis loops 312 may sequentially detect the second electromagnetic signals as electric signals.

The X axis loops 312 may convert an input signal from the multi-level driver 320 through the switch 330 into the first electromagnetic signal, and may output the first electromagnetic signal to the outside. The input unit 168 may receive the first electromagnetic signal, may generate the second electromagnetic signal according to an operation of the resonance circuit 250, and may output the second electromagnetic signal to the outside. The Y axis loops 314 may sequentially detect the second electromagnetic signals as electric signals.

The switch 330 may connect the reception circuit 340 with a corresponding loop of the sensor board 310, and may output a signal input from the corresponding loop to the reception circuit 340 when the digitizer performs reception.

The reception circuit 340 may convert a signal input from the switch 330 into a digital signal, and may output the digital signal to the controller 110 or the input device controller 195.

The controller 110 or the input device controller 195 may obtain X axis and Y axis coordinates of a position of a pen input from a digital signal having a peak value greater than or equal to a threshold value from among digital signals input from the reception circuit 340.

Figure 5:
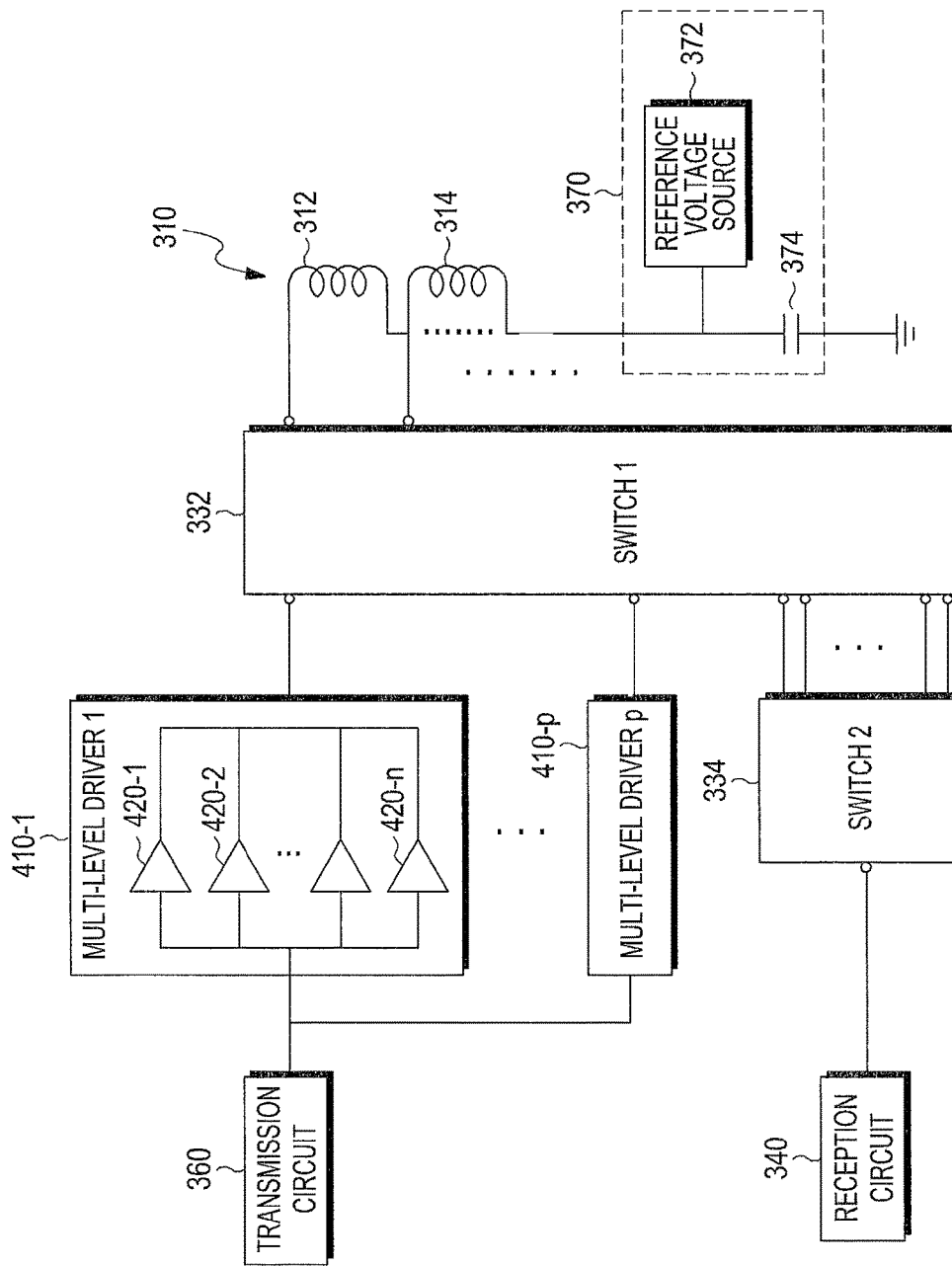
FIG. 5 illustrates a circuit of a digitizer according to various embodiments of the present disclosure.

FIG. 5 illustrates a circuit of a digitizer according to various embodiments of the present disclosure.

The digitizer, corresponding to an EM type digitizer, may include the sensor board 310, the transmission circuit 360, a plurality of multi-level drivers 410-1 through 410-$p$, first and second switches 332 and 334, and the reception circuit 340.

The transmission circuit 360 may output a signal based on a control of the controller 110 or the input device controller 195.

The plurality of multi-level drivers 410-1 through 410-$p$ correspond to at least one of the entire plurality of loops 312 and 314 in a one-to-one correspondence or a one-to-multiple correspondence, and simultaneously, may be connected with a corresponding loop from among the plurality of loops 312 and 314 through the first switch 332. For example, each of the multi-level drivers 410-1 through 410-$p$ may include a plurality of unit drivers 420-1 through 420-$n$. A total number of multi-level drivers 410-1 through 410-$p$ may be less than or equal to a total number of loops. Each of the plurality of multi-level drivers 410-1 through 410-$p$ receives a signal output from the transmission circuit 360. Each unit driver 420-1 through 420-$n$ amplifies (or damps) an input signal, and outputs ("I1" through "In") of the plurality of unit drivers 420-1 through 420-$n$ may be added up and output to the first switch 332. For example, when each unit driver 420-1 through 420-$n$ has a predetermined voltage and a capacity of 30 mA, each multi-level driver 410-1 through 410-$p$ may have a capacity of 30 mA*n. In this example, n is an integer greater than or equal to 2. In this example, a capacity of a driver indicates a maximum output that may be output from the driver.

Also, according to an embodiment of the present disclosure, each of the plurality of multi-level drivers 410-1 through 410-$p$, for example, may include an identical number of unit drivers (for example, or having an identical configuration), or may include a different number of unit drivers.

The first switch 332 may be sequentially connected with the plurality of multi-level drivers 410-1 through 410-$p$, and simultaneously, may be sequentially connected with the plurality of loops 312 and 314. For example, the first switch 332 outputs a signal input from a corresponding multi-level driver 410-1 through 410-$p$, to a corresponding loop of the sensor board 310. In this example, the first and second switches 332 and 334 may form the switch 330 of FIG. 4.

Each loop 312 and 314 of the sensor board 310 may be connected with a reference voltage circuit 370 including a reference voltage source 372 and a capacitor 374. The reference voltage circuit 370 provides a reference voltage or a bias voltage to each loop 312 and 314, and the reference voltage input from the reference voltage circuit 370 and a voltage input from the multi-level drivers 410-1 through 410-$p$ are added up and provided to each loop 312 and 314. Each loop 312 and 314 converts a signal input from the multi-level driver 410 through the first switch 332 into an electromagnetic signal so as to output the electromagnetic signal, and absorbs an electromagnetic signal that the input unit 168 outputs so as to output the electromagnetic signal as a signal.

The second switch 334 may be sequentially connected with the plurality of loops 312 and 314 through the first switch 332, and may output a signal input from a corresponding loop to the reception circuit 340. Unlike the present example, the second switch 334 may be omitted, and the first switch 332 may perform a function of the second switch 334.

The reception circuit 340 may convert a signal input from the second switch 334 into a digital signal and may output the digital signal to the controller 110 or the input device controller 195.

The controller 110 or the input device controller 195 may obtain X axis and Y axis coordinates of a position of a pen input from a digital signal having a peak value greater than or equal to a threshold value from among digital signals input from the reception circuit 340.

The multi-level drivers 410-1 through 410-$p$ add up outputs of two or more unit drivers 420-1 through 420-$n$ and input the added up value into a corresponding loop, so as to increase an output level to be higher when compared to an output of a single unit driver.

Through the multi-level drivers 410-1 through 410-$p$, a power level provided to the digitizer may be increased in comparison to a conventional way. Accordingly, performance of an edge area of the digitizer may be improved, a possible hovering height may be increased, an output level of the digitizer may be increased, and a writing quality may be enhanced by improving the output level of the digitizer.

Also, the loops included in the edge area of the digitizer may be driven with a high-capacity or a high-output, and the loops included in a center area of the digitizer may be driven with a low-capacity or a low-output.

Also, the loops may be driven differently based on a hovering state or a contact or a proximity state of the input unit 168. For example, when the input unit 168 is in a hovering state, the loops of the digitizer may be driven with a high-capacity or high-output, and when the input unit 168 is in a contact or proximity state, the loops may be driven with a low-capacity or low-output.

Also, the digitizer may be reliably driven by disposing a unit driver that is fixedly connected with and a unit driver that is selectively connected with the multi-level drivers 410-1 through 410-$p$.

Figure 6:
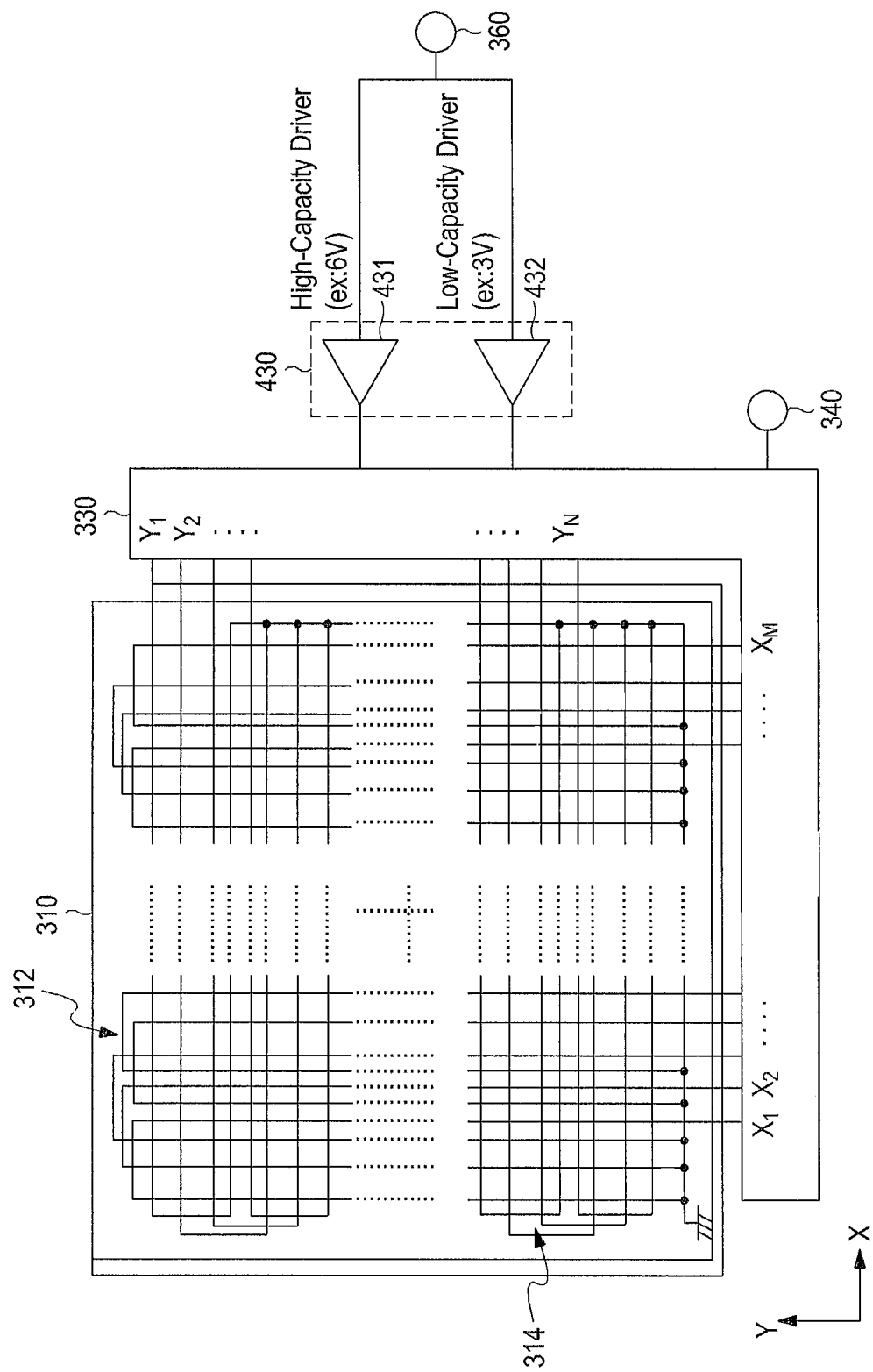
FIG. 6 illustrates a block diagram showing a configuration of a digitizer according to various embodiments of the present disclosure.

FIG. 6 illustrates a block diagram showing a configuration of a digitizer according to various embodiments of the present disclosure. The digitizer has a similar configuration to the digitizer of FIG. 4, and has a difference only in a configuration of a multi-level driver and thus, reiteration will be omitted.

The multi-level driver 430 may include a plurality of unit drivers 431 and 432 having different capacities, and each unit driver 431 and 432 amplifies (or dampens) a signal input from a transmission circuit so as to output the signal, and an output of one selected from among the plurality of unit drivers 431 and 432 may be output to a switch. In this example, the multi-level driver may include a high-capacity unit driver 431 and a low-capacity unit driver 432. For example, the high-capacity unit driver 431 may have a capacity of 6V and the low-capacity unit driver 432 may have a capacity of 3V.

The switch 330 may provide a signal input from the multi-level driver 430 to a corresponding loop.

Figure 7:
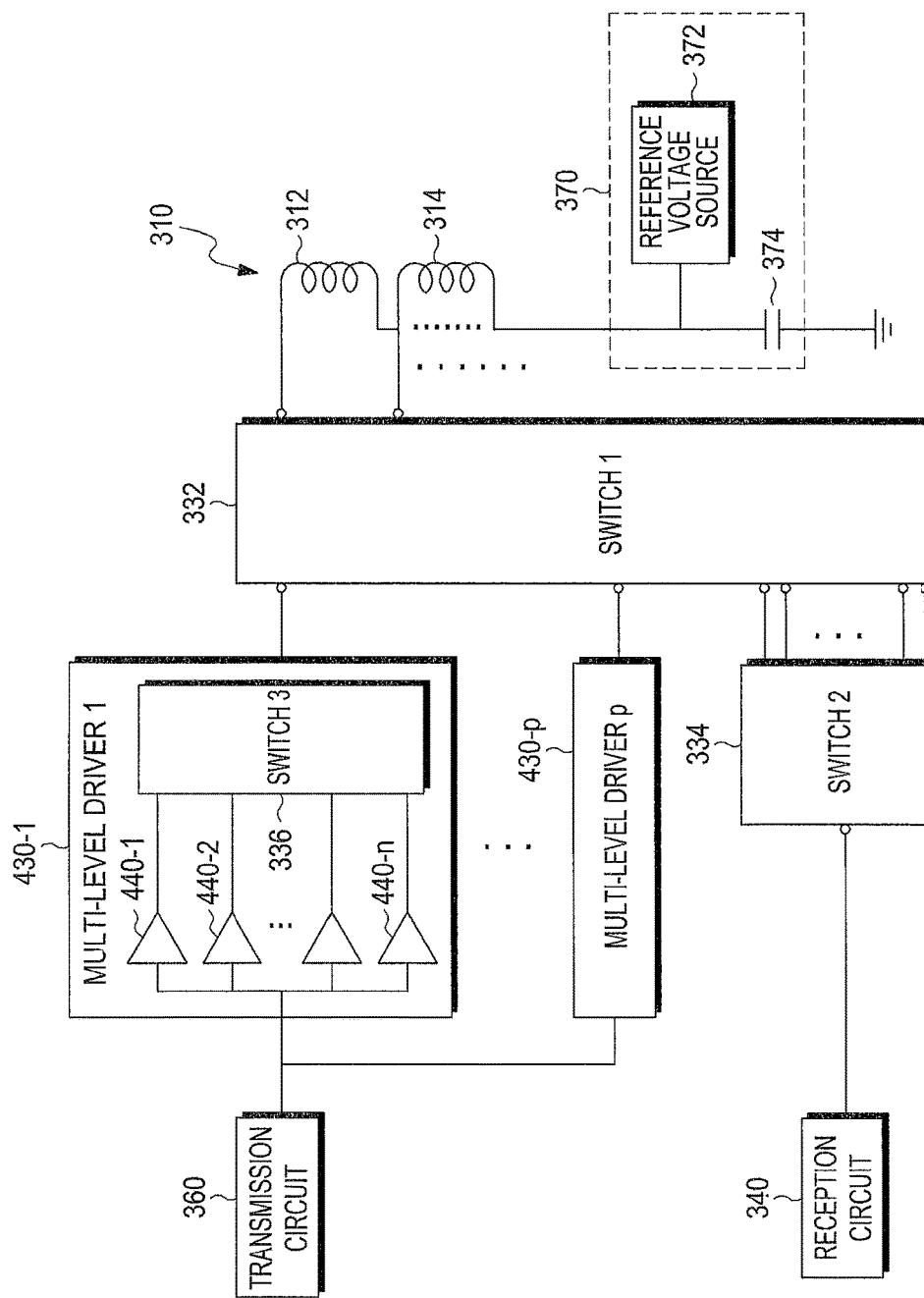
FIG. 7 illustrates a circuit of a digitizer according to various embodiments of the present disclosure.

FIG. 7 illustrates a circuit of a digitizer according to various embodiments of the present disclosure. The digitizer has a similar configuration to the digitizer of FIG. 5, and has a difference only in a configuration of a multi-level driver and thus, reiteration will be omitted. A plurality of multi-level drivers 430-1 through 430-$p$ may correspond to at least one of the plurality of loops 312 and 314 in one-to-one correspondence or one-to-multiple correspondence, and simultaneously, may be connected with the same through the first switch 332, and each multi-level driver 430-1 through 430-*p* may include a plurality of unit drivers 440-1 through 440-*n* having different capacities. A total number of multi-level drivers 430-1 through 430-*p* may be less than or equal to a total number of loops 312 and 314. Each of the plurality of multi-level drivers 430-1 through 430-*p* receives a signal output from the transmission circuit 360. Each unit driver 440-1 through 440-*n* amplifies and outputs an input signal, and an output of one selected from among the plurality of unit drivers 440-1 through 440-*n* may be output to the first switch 332. For example, the first unit driver 440-1 has a first capacity of 6V and 120 mA, the $n^{th}$ unit driver 440-*n* has an $n^{th}$ capacity of 3V and 60 mA, and second through $(n-1)^{th}$ unit drivers may have capacities that decrease at a predetermined rate within a range between the first through and the $n^{th}$ capacities.

Also, the plurality of multi-level drivers 430-1 through 430-*p*, for example, may include an identical number of unit drivers (for example, or having an identical configuration), or may include a different number of unit drivers.

A third switch 336 may be selectively connected with one of the plurality of unit drivers 440-1 through 440-*n* based on a control of the controller 110 or the input device controller 195, and may output a signal input from the selected unit driver to a corresponding loop of the sensor board 310.

The multi-level drivers 430-1 through 430-*p* select one of the unit drivers 440-1 through 440-*n* having different capacities and changes an output level and thus, the realistic difficulty in changing an output level of a single unit driver may be overcome.

The multi-level driver 430-1 through 430-*p*, for example, selects a high-capacity driver (MAX 6V and 120 mA) in a hovering state and selects a low-capacity driver (Max 3V and 60 mA) in a contact or proximity state and thus, may help improve a hovering performance and may decrease power consumption.

Figure 8:
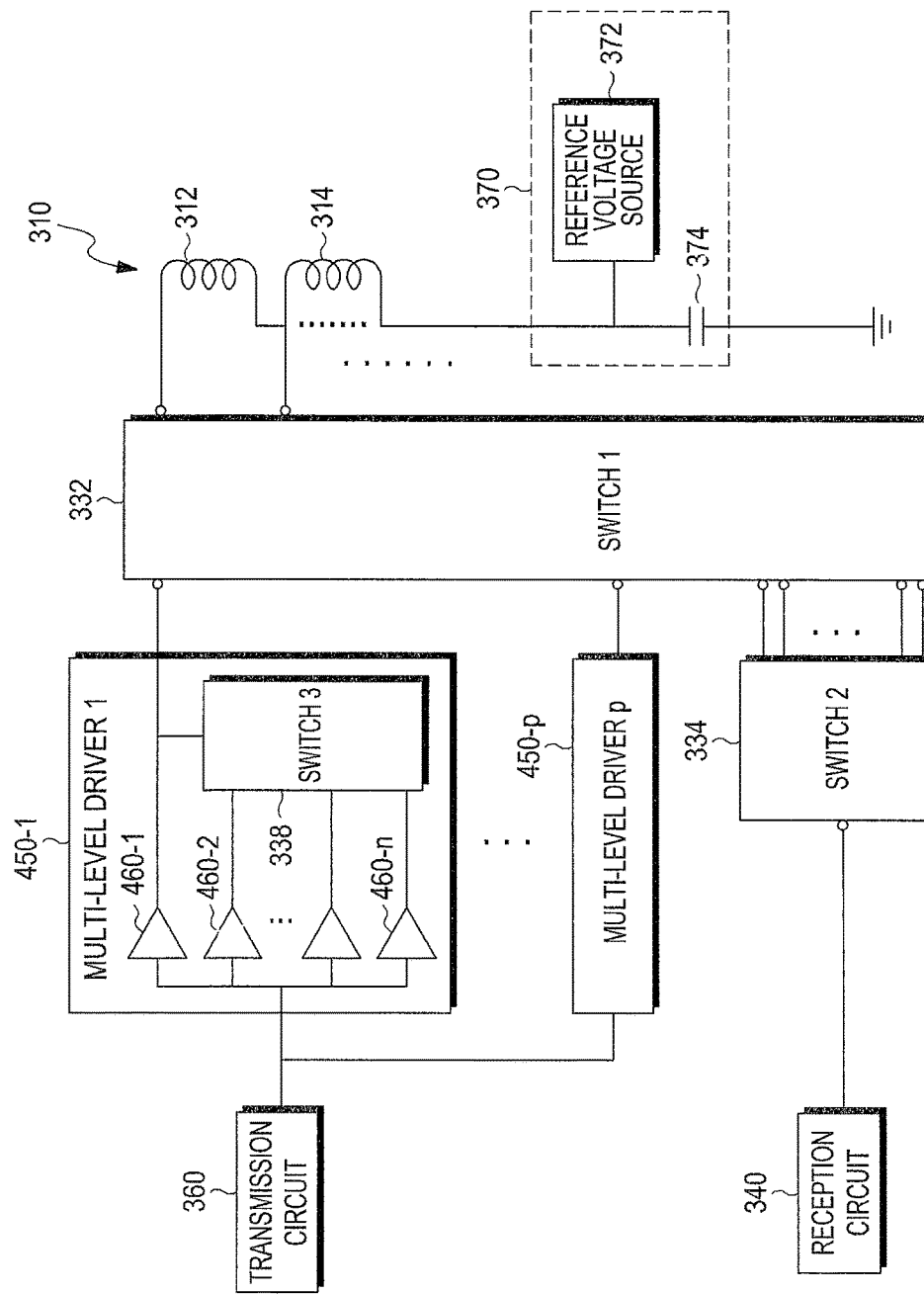
FIG. 8 illustrates a circuit of a digitizer according to various embodiments of the present disclosure.

FIG. 8 illustrates a circuit of a digitizer according to various embodiments of the present disclosure. The digitizer has a similar configuration to the digitizer of FIG. 7, and has a difference only in a configuration of a multi-level driver and thus, reiteration will be omitted.

A plurality of multi-level drivers 450-1 through 450-*p* may correspond to at least one of the plurality of loops 312 and 314 in one-to-one correspondence or one-to-multiple correspondence, and simultaneously, may be connected with the same through the first switch 332, and each multi-level driver 450-1 through 450-*p* may include a fixedly connected first unit driver 460-1 and second through the $n^{th}$ drivers 460-2 through 460-*n* having an identical capacity or different capacities. A total number of multi-level drivers 450-1 through 450-*p* may be less than or equal to a total number of loops. Each of the plurality of multi-level drivers 450-1 through 450-*p* receives a signal output from the transmission circuit 360. Each unit driver 460-2 through 460-*n* amplifies (or dampens) and outputs an input signal, and outputs from the first unit driver 460-1 and one selected from among the second through nth drivers 460-2 through 460-*n* may be added up and output to the first switch. For example, the first unit driver 460-1 has a first capacity of 3V and 60 mA, the second unit driver 460-2 has a second capacity of 6V and 120 mA, the $n^{th}$ unit driver 460-*n* has an $n^{th}$ capacity of 3V and 60 mA, and third through $(n-1)^{th}$ unit drivers may have capacities that decrease at a predetermined rate within a range between the second through and the $n^{th}$ capacities.

Also, the plurality of multi-level drivers 450-1 through 450-*p* may include an identical number of unit drivers (for example, or having an identical configuration), or may include a different number of unit drivers.

A third switch 338 may be selectively connected with one of the second through the $n^{th}$ unit drivers 460-2 through 460-*n* based on a control of the controller 110 or the input device controller 195, and may output a signal input from the selected unit driver. Signals output from the first unit driver 460-1 and the one selected from among the second through the $n^{th}$ unit drivers 460-2 through 460-*n* may be added up and output to a corresponding loop of the sensor board 310. In this example, the third switch 338 may not be connected with any of the second through the $n^{th}$ unit drivers 460-2 through 460-*n*.

The multi-level drivers 450-1 through 450-*p* may use the fixed connected first unit driver 460-1 and an additional unit driver 460-2 through 460-*n* that is selected based on a situation.

For example, the multi-level driver 450-1 through 450-*p* uses an additional unit driver and thus, may overcome a limit on performance of a single unit driver.

It is understood that the multi-level driver 450-1 through 450-*p* according to the third example has a structure of a combination of the multi-level driver of FIG. 5 and the multi-level driver of FIG. 7.

The multi-level driver 450-1 through 450-*p*, for example, may use only the first unit driver 460-1 of 3V and 60 mA for a situation in which a relatively weak signal strength is used, such as a contact or proximity state, and may additionally use the second unit driver 460-2 of 6V and 120 mA or the $n^{th}$ unit driver 460-*n* of 3V and 60 mA for a hovering state.

Figure 9:
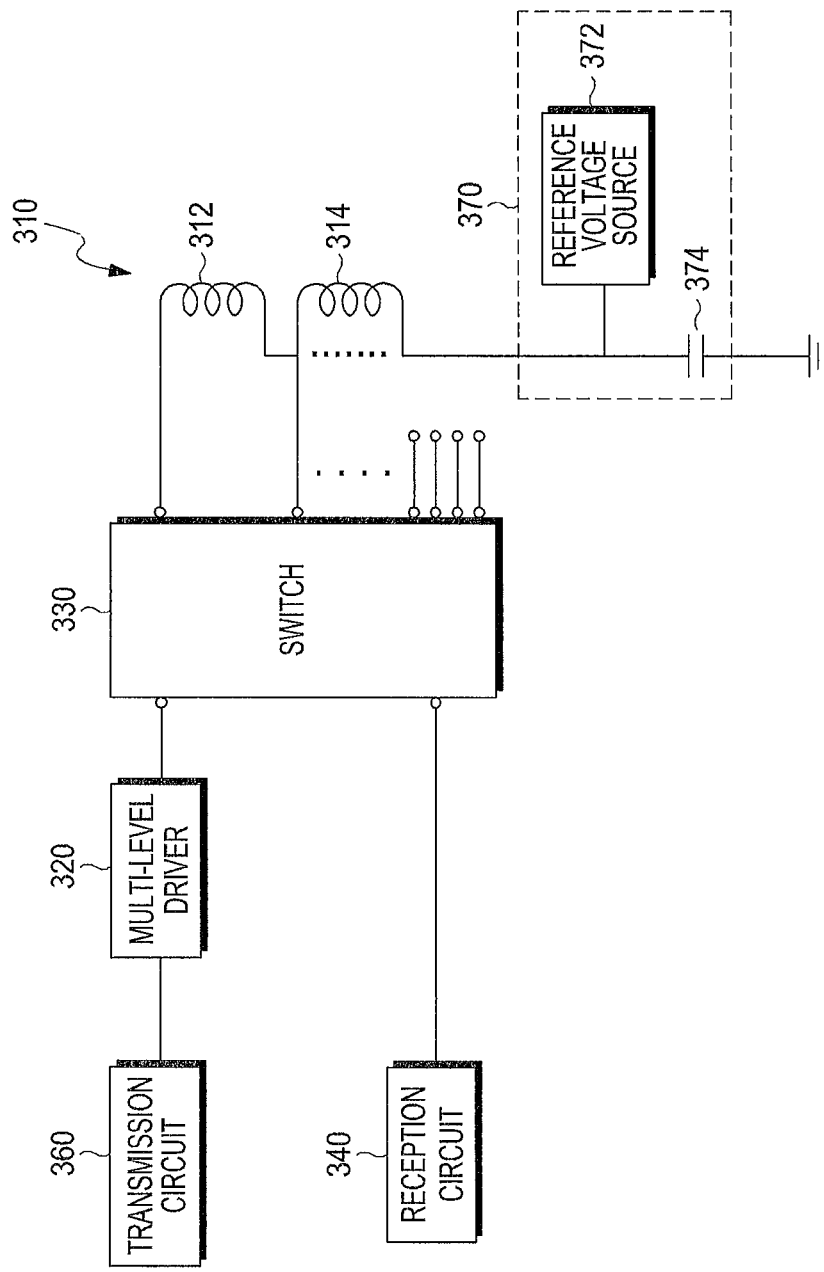
FIG. 9 illustrates a circuit of a digitizer according to various embodiments of the present disclosure.

FIG. 9 illustrates a circuit of a digitizer according to various embodiments of the present disclosure. The digitizer, corresponding to an EM type digitizer, may include the sensor board 310, the transmission circuit 360, the multi-level driver 320, the switch 330, and the reception circuit 340. The transmission circuit 360 may output a signal based on a control of the controller 110 or the input device controller 195.

The multi-level driver 320 may correspond to at least one of the entire plurality of loops 312 and 314 in one-to-one correspondence or one-to-multiple correspondence, and simultaneously, may be connected with the same through the switch 330. The multi-level driver 320 may have a configuration of a multi-level driver disclosed in any one of FIGS. 5, 7, and 8. The multi-level driver 320 may receive a signal output from the transmission circuit 360. The multi-level driver 320 may amplify an input signal and may output the amplified signal to the switch 330.

The switch 330 may be sequentially connected with the entire plurality of loops 312 and 314, and may output a signal input from the multi-level driver 320 to a corresponding loop of the sensor board 310.

Each loop of the sensor board 310 may be connected with the reference voltage circuit 370 including the reference voltage source 372 and the capacitor 374. The sensor board 310 includes the plurality of loops 312, may operate based on a signal input from the multi-level driver 320 through the switch 330, and may output a received signal to the switch 330.

Also, the switch 330 may be sequentially connected with the entire plurality of loops 312 and 314, and may output a signal input from a corresponding loop to the reception circuit 340.

The reception circuit 340 may convert a signal input from the switch 330 into a digital signal and may output the digital signal to the controller 110 or the input device controller 195.

Figure 10:
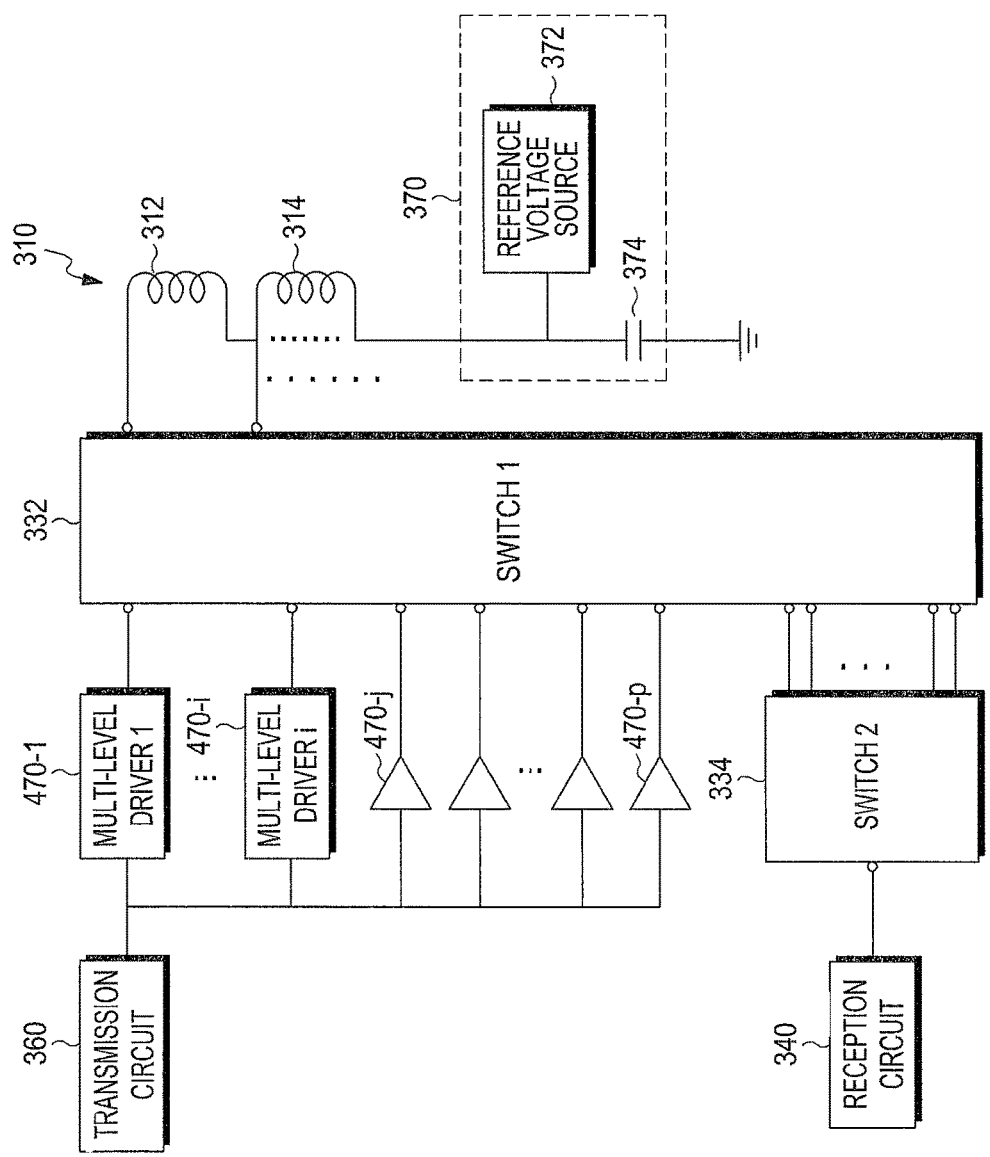
FIG. 10 illustrates a circuit of a digitizer according to various embodiments of the present disclosure.
Figure 11:
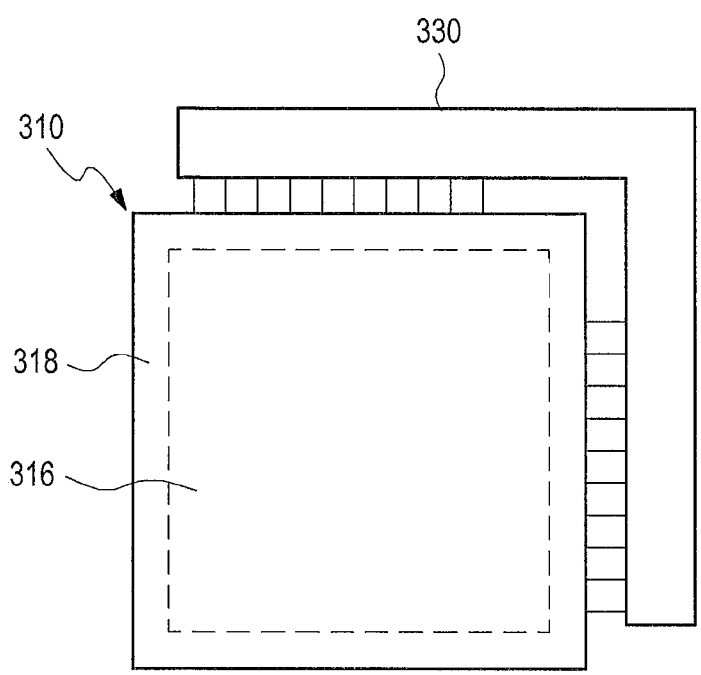
FIG. 11 illustrates an edge area of a digitizer according to various embodiments of the present disclosure.

FIG. 10 illustrates a circuit of a digitizer according to various embodiments of the present disclosure, and FIG. 11 illustrates an edge area of a digitizer according to various embodiments of the present disclosure. The digitizer has a similar configuration to the digitizer of FIG. 5, and has a difference only in a configuration of a multi-level driver and thus, reiteration will be omitted.

A plurality of multi-level drivers 470-1 through 470-i may correspond to a few of the entire plurality of loops 312 and 314, and may also correspond to at least one of the few loops in one-to-one correspondence or one-to-multiple correspondence, and simultaneously, may be connected with the same through the first switch 332. Each multi-level driver 470-1 through 470-i may have a configuration of a multi-level driver disclosure in any one of the various embodiments of the present disclosure, for example, the multi-level drivers 420-1, 430-1, 440-1 or 450-1.

A plurality of uni-level drivers 470-j through 470-p may correspond to the remaining loops of the entire plurality of loops 312 and 314, may also correspond to at least one of the remaining loops in one-to-one correspondence or one-to-multiple correspondence, and simultaneously, may be connected with the same through the first switch 332. Each uni-level driver 470-j through 470-p may have a configuration of a unit driver disclosed in any one of the various embodiments of the present disclosure.

The first switch 332 may be sequentially connected with the multi-level drivers 470-1 through 470-i and uni-level drivers 470-j through 470-p, and simultaneously, may be sequentially connected with the entire plurality of loops 312 and 314, and may output a signal input from a corresponding multi-level driver or a corresponding uni-level driver to a corresponding loop of the sensor board 310.

The loops included in the edge area 318 of the sensor board 310 are driven through the multi-level drivers 470-1 through 470-i, and the loops included in the center area 316 of the sensor board 310 are driven through the uni-level drivers 470-j through 470-p and thus, an effect from signal attenuation by adjacent devices of a digitizer may be reduced and an intensity of a signal output or detected from an edge and center areas of the digitizer may be made uniform.

An edge performance, a hovering height, and a phenomenon in which a writing quality deteriorates due to a weak signal strength may be improved by adding a multi-level driver having a relatively large capacity (for example, 180 mA), but power consumption may dramatically increase when the multi-level driver is used for all loops and thus, the multi-level driver may be selectively used for the edge area of the digitizer.

FIG. 12 illustrates an example of applying a digitizer. A position pointing device, which is in a type different from the input unit 168, receives and stores power (for example, an electromagnetic signal) during a predetermined period of time from a loop of a sensor board, and operates using the power. An operation in which a digitizer transmits power to a passive position pointing device may be referred to as activation.

FIG. 12A illustrates a transmission section/reception section (T/R) of a digitizer, and FIG. 12B illustrates a signal that a digitizer transmits in the transmission section/reception section (T/R). FIG. 12C illustrates an intensity of a voltage provided to loops of a sensor board for signal transmission of a digitizer, and FIG. 12D illustrates whether a signal transmitted from a digitizer is for activation or for detecting a user input (Data1, Data2, Data3, and Data 4).

When a position pointing device that needs activation is operated, a high-capacity driver may be used during an activation section to shorten the activation section and to provide seamless usability.

Also, when the input unit 168 is not detected from the sensor board 310, a driver of a relatively low frequency of output (for example, 60 Hz) may be used in a mode for detecting the input unit 168. When the input unit 168 is detected, a driver of a relatively high frequency of output (for example, 250 Hz) may be used for sensing a precise input. For example, a number of pulses output per unit time from the driver of a high frequency of output is greater than a number of pulses output per unit time from the driver of a low frequency of output. Also, in the mode for detecting the input unit 168 or in the hovering mode, a driver of a relatively high output level (for example, 200 mA) may be used. When the input unit 168 is used in a short distance, a driver of a low output level (for example, 60 mA) may be used. Also, when the input unit 168 is detected in a short distance but has not been used during a long period of time, a driver of a relatively low frequency of output may be used. Also, when an application used in the user device 100 does not need a hovering action input, a driver of a low output level may be used. Also, when an application used in the user device 100 does not need an accurate user input, a driver of a low frequency of output may be used.

According to various embodiments of the present disclosure, an accuracy of an edge area and a possible hovering height may be improved by driving an edge area of a digitizer with power higher than a center area.

Although the present disclosure has been described with an example embodiment, various changes and modifications may be suggested to one skilled in the art. It is intended that the present disclosure encompass such changes and modifications as fall within the scope of the appended claims.

What is claimed is:

1. An input device, comprising:

a sensor board that includes a first loop disposed in a center area of the sensor board and a second loop disposed in an edge area of the sensor board;

a first multi-level driver circuit that includes a first set of driver circuits, and is set to output, to the first loop, a first sum signal generated by adding up at least two signals output from the first set of driver circuits; and a second multi-level driver circuit that includes a second set of driver circuits, and is set to output, to the second loop, a second sum signal generated by adding up at least two signals output from the second set of driver circuits, wherein electric power of the second sum signal is greater than electric power of the first sum signal.

2. The input device of claim 1, wherein the first loop is configured to output the first sum signal as an electromagnetic (EM) signal and the second loop is configured to output the second sum signal as an EM signal.

3. The input device of claim 1, further comprising:

a first switch that connects the first and second multi-level driver circuits with the first and second loops.

4. The input device of claim 1, further comprising:

a second switch that selects a first signal output from a first driver circuit from among the first set of driver circuits, wherein the first multi-level driver circuit generates the first sum signal by adding up the first signal output from the second switch and a second signal output from a second driver circuit from among the first set of driver circuits.

5. The input device of claim 3, wherein the input device further includes at least one uni-level driver circuit, and the first switch is set to connect the at least one uni-level driver circuit with at least one loop.

6. The input device of claim 4, wherein, when an input that satisfies a predetermined condition is provided to the sensor board, an output level of the first multi-level driver circuit is configured to be lowered.

7. The input device of claim 4, wherein the first multi-level driver circuit is configured to change the first sum signal based on an operation mode of the sensor board.

8. The input device of claim 4, wherein the first multi-level driver circuit is configured to change the first sum signal based on an accuracy of an input.

9. A user device comprising:
an input device, comprising:
a sensor board that includes a first loop disposed in a center area of the sensor board and a second loop disposed in an edge area of the sensor board;
a first multi-level driver circuit that includes a first set of driver circuits, and is set to output, to the first loop, a first sum signal generated by adding up at least two signals output from the first set of driver circuits; and
a second multi-level driver circuit that includes a second set of driver circuits, and is set to output, to the second loop, a second sum signal generated by adding up at least two signals output from the second set of driver circuits,
wherein electric power of the second sum signal is greater than electric power of the first sum signal.

10. The input device of claim 1, wherein each of the first and second loops is configured to output and receive electromagnetic (EM) signals.

* * * * *